(12) United States Patent
Guse et al.

(10) Patent No.: US 8,126,744 B2
(45) Date of Patent: Feb. 28, 2012

(54) METHOD FOR RECTIFYING FAULTS IN TECHNICAL FACILITIES

(75) Inventors: Claudia Guse, Forchheim (DE); Markus Rascher, Erlangen (DE); Rainer Schnabl, Baiersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 614 days.

(21) Appl. No.: 11/494,014

(22) Filed: Jul. 27, 2006

(65) Prior Publication Data

US 2007/0124225 A1   May 31, 2007

Related U.S. Application Data

(60) Provisional application No. 60/704,158, filed on Jul. 29, 2005.

(30) Foreign Application Priority Data

Jul. 29, 2005   (DE) .......................... 10 2005 036 320

(51) Int. Cl.
*G06Q 40/00* (2006.01)
*G06Q 10/00* (2006.01)

(52) U.S. Cl. ............. 705/4; 705/302; 705/304; 705/305

(58) Field of Classification Search ........................ None
See application file for complete search history.

(56) References Cited

U.S. PATENT DOCUMENTS

| | | | | |
|---|---|---|---|---|
| 2002/0035495 | A1* | 3/2002 | Spira et al. | 705/7 |
| 2003/0101154 | A1* | 5/2003 | Hisano et al. | 706/50 |
| 2003/0163440 | A1* | 8/2003 | Tonack | 707/1 |
| 2003/0233323 | A1* | 12/2003 | Bilski et al. | 705/40 |
| 2004/0122697 | A1* | 6/2004 | Becerra et al. | 705/1 |
| 2005/0182660 | A1* | 8/2005 | Henley | 705/2 |
| 2005/0251416 | A1* | 11/2005 | Greene | 705/2 |
| 2006/0085535 | A1* | 4/2006 | Motoyama et al. | 709/224 |
| 2006/0149438 | A1* | 7/2006 | Roberts | 701/29 |
| 2006/0190280 | A1* | 8/2006 | Hoebel et al. | 705/1 |
| 2006/0217929 | A1* | 9/2006 | Gellen et al. | 702/184 |
| 2007/0225986 | A1* | 9/2007 | Bowe et al. | 705/1 |

OTHER PUBLICATIONS

Norfolk, Va.-Based Company Protests Navy s Choice for Drydock Overhaul; Dennis O'Brien; Virginian-Pilot, Norfolk, Va; Sep. 12, 2000; 3-pages.*

Federal regulations and the competitiveness of U.S. liner ship operators; Waters, Robert C.; Transportation Journal. Lock Haven: Fall 1993. vol. 33, Iss. 1; 5-pages.*

The Fifty Percent Ad Valorem Duty on Foreign Ship Repairs: Scope of Application; Hadley, Lawrence M.; The George Washington Journal of International Law and Economics; 1990; 24, 2; 39-pages.*

* cited by examiner

*Primary Examiner* — Gregory Johnson

(57) ABSTRACT

Faults in technical facilities are oftentimes unanticipatable and unplannable. For the operator of a facility, it is therefore always uncertain when and at what level costs will be incurred for fault rectification. A method is therefore proposed for rectifying faults in technical facilities by which for a defined period of time, and for a number of facility components which are defined before the period starts, the rectification of faults is undertaken by a technical service organization, for which purpose an operator of a facility pays the service organization a defined sum of money for the defined period of time, whereby the costs of fault rectification during the defined period of time are then met by the service organization, up to level of the sum of money, and costs over and above this are met by an insurance company. The facility operator then has from the outset costs which can be estimated and planned, and need not establish separate reserves. On the other hand, it is possible to guarantee expert fault rectification in a short time, whereby the downtimes for the facility are reduced.

12 Claims, 4 Drawing Sheets

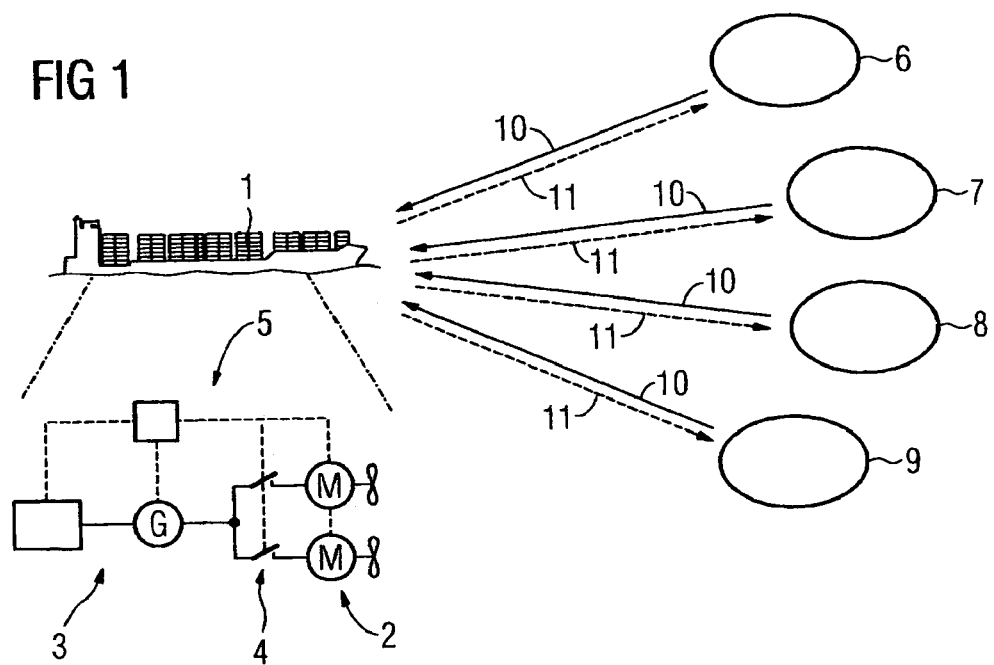
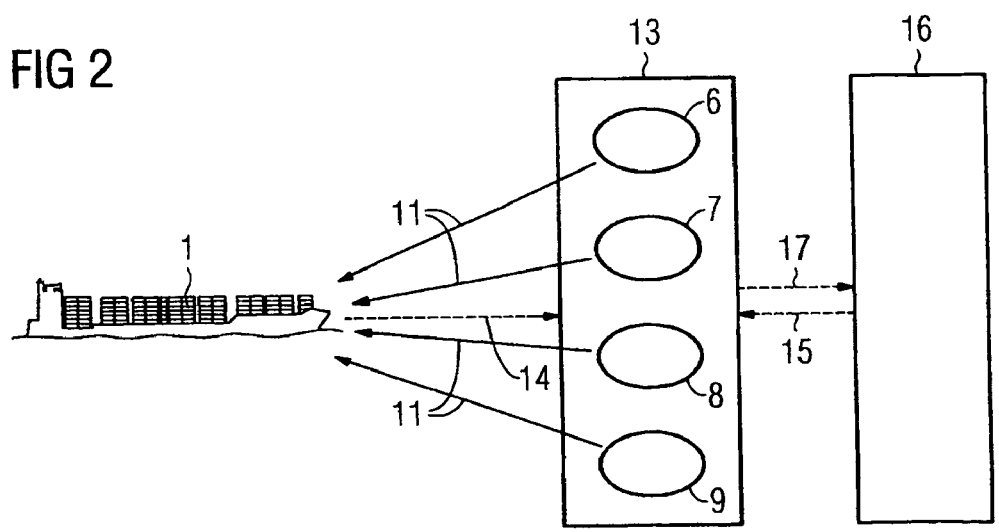

METHOD FOR RECTIFYING FAULTS IN TECHNICAL FACILITIES

CROSS REFERENCE TO RELATED APPLICATIONS

The present application claims the benefit of the provisional patent application filed on Jul. 29, 2005, and assigned application No. 60/704,158. The present application also claims the benefit of German application No. 10 2005 036 320.2 DE filed Jul. 29, 2005. Both of the applications are incorporated by reference herein in their entirety.

FIELD OF THE INVENTION

The invention relates to a method for rectifying faults in technical facilities.

BACKGROUND OF THE INVENTION

Faults in technical facilities are almost always unanticipatable and unplannable. For the operator of a facility it is therefore always uncertain when and at what level costs will be incurred for fault rectification. This applies in particular for moveable facilities, such as for example ships, because depending on where they happen to be and on the circumstances their accessibility may be made more difficult and, apart from the activities purely to eliminate the fault, additional costs may arise for journeys to the site by service personnel (travel and overnight costs) and service equipment (shipping costs). Furthermore, facility failures have high associated risks for the facility operator, e.g. because of the dangers to people and machinery, the time delays, lost production etc. which arise from them. The operators of such facilities therefore frequently set up contingency reserves for potential emergency fault elimination situations. The rectification of faults is financed with the help of these reserves.

Difficulties are presented on the one hand by the estimation of costs for fault rectification, and the establishment of reserves for them. If the reserves established are too limited, the situation can arise in which all the reserves for fault rectification have been used up, and further fault rectification work must be financed in some other way. Such problems in the financing of fault rectification are frequently associated with time loss and correspondingly high downtimes.

Furthermore, the entire organization and carrying out of the fault rectification work, and the entire process of establishing reserves, involves a relatively high cost for the operator of the facility.

SUMMARY OF THE INVENTION

The objective of the present invention is therefore to specify a method for rectifying faults in technical facilities by which downtimes due to faults in the technical facility can be reduced at the same time as minimizing the financial risks for the operator of the facility.

In accordance with the invention this objective is achieved in that, for a defined period of time, and for a number of facility components which are defined before the period starts, the rectification of faults is undertaken by a technical service organization. For this purpose, the operator of a facility pays the service organization a defined sum of money for the defined period of time. The costs of fault rectification during the defined period of time are then met by the service organization, up to the level of the agreed sum of money, and costs over and above this are met by an insurance company.

Advantageous embodiments of the method are in each case the subject of a subclaim.

Thus, the operator of the facility pays for a predefined period of time, for example one year, a certain sum of money which covers the entire costs of rectifying faults. He then has at the outset costs which can be estimated and planned, and need not establish separate reserves. The risk of the uncertain costs is ultimately borne by the insurance company. Here, the insurance is concluded between the service organization and the insurance company. The service organization builds the insurance premium into the sum of money agreed with the facility operator.

The entire organization and carrying out of the fault elimination-work is effected by the technical service organization. One result of this is that for the facility operator the cost of fault rectification is reduced. On the other hand, particularly expert fault rectification by a service organization which specializes in such activities can reduce the downtimes.

In order to minimize downtimes, an agreement can be reached between the facility operator and the service organization, before the time period of, for example, one year begins, about the response and start-of-work times for fault rectification.

The sum of money for the defined period of time will preferably include in addition, for the defined facility components, provision by the service organization of maintenance and/or spare parts procurement and/or online support in the case of faults. This will ensure proper maintenance and the correct installation of the right replacement parts.

Investigations have shown that unified technical services, tailored to the individual requirements of the facility, with a regulated supply of spare parts, regular and selective maintenance work, together with expertly performed fault elimination and support for fault elimination, ensure the maintenance of value and a longer service life for the technical components of the facility, and in addition their safety and reliability also increase.

The more the measures mentioned above are carried out for the facility, the lower therefore is the premium to be paid to the insurance company by the technical service organization, for meeting the costs over and above the agreed sum of money. Correspondingly, the sum of money demanded of the facility operator by the service organization will also be lower. For example, thermography carried out on the facility during maintenance work could lead to a rebate of 30% on the insurance premium.

Services tailored to the individual requirements of a facility are made possible by storing the component, system and facility data concerned, linked to the service measures required in each case, in a database of the service organization.

The invention is suited with particular advantage for application to moveable facilities, such as for example ships, for which the costs of fault rectification are particularly difficult to estimate and at the same time there are particularly high failure risks. Examples of ships of this type are passenger ships (ferries, cruise ships) with particular risks for the passengers, container ships for which faults result in delays to the schedule, which particularly for perishable goods transport has high associated risks, and special ships, such as heavy lift cargo ships with particularly time-critical jobs.

However, the invention is also suitable for use with static facilities with high failure risks, in particular industrial production facilities such as for example rolling mills and steel works, paper factories, cement works, sorting facilities and production facilities in the automobile industry.

BRIEF DESCRIPTION OF THE DRAWINGS

The invention, together with advantageous embodiments of the invention in accordance with the characteristics of the sub-claims, is explained in more detail below by reference to exemplary embodiments in the figures. These show:

FIG. 1 a representation of the flows of money and services conforming to a service concept already known, FIG. 2 a representation of the flows of money and services conforming to a service concept in accordance with the invention, FIG. 3 a system architecture to support the method in accordance with the invention, FIG. 4-7 the data structure of the database in FIG. 3.

DETAILED DESCRIPTION OF THE DRAWINGS

Figure 3:
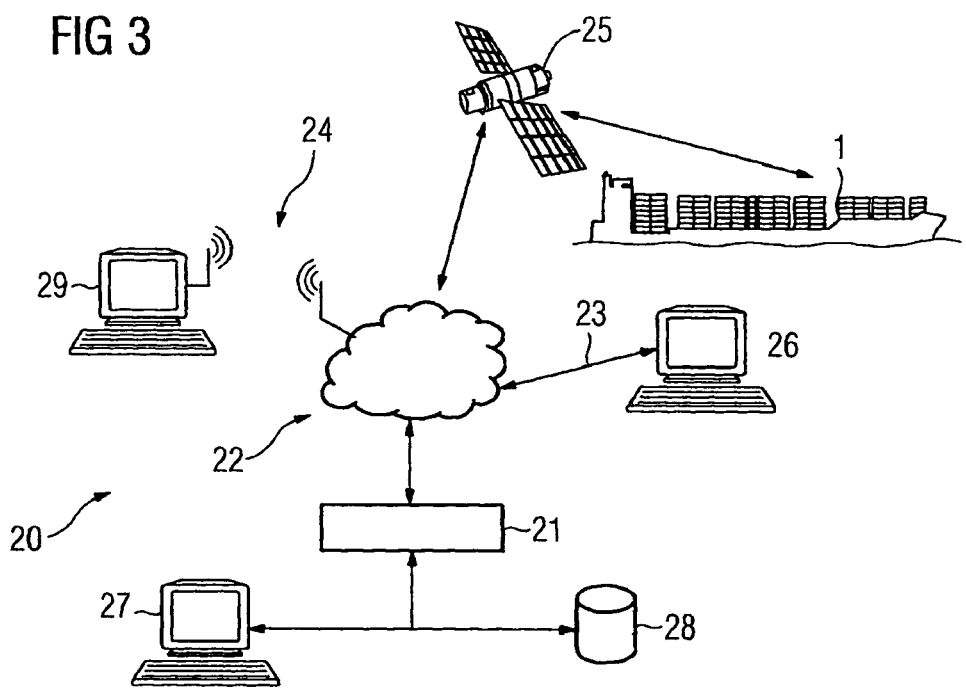

A ship, shown in FIG. 1, incorporates numerous electrical engineering facility components, such as for example, drives 2, energy supply equipment 3, energy distribution equipment 4 and automation devices 5. Fault rectification 6, maintenance measures 7, spare parts procurement 8 and online support 9 for faults, are to some extent organized by the ship-owner 1, and are carried out by that entity itself or by external service organizations, where the costs of these measures are borne by the ship-owner. The associated service streams are shown as continuous lines 10, and the associated money flows by the dashed lines 11.

Because of the mobility of the ship 1 and the associated worldwide changes of location, the costs for fault rectification 6 can only with difficulty be planned. The ship-owner has therefore established reserves for this, which fund the fault rectification activities. The establishment of the reserves, together with the organization and carrying out of the measures for fault rectification 6, maintenance 7, spare parts procurement 8 and online support 9 is expensive and, not infrequently deficient, as a result of which downtimes are increased and the service life of the facility components reduced.

In accordance with the invention, the procurement of spare parts 8 for the facility components and online support 9 in the event of faults is—as illustrated in FIG. 2—undertaken for a defined period of time, for example one year, by a technical service organization 13. Here, the number and nature of the facility components is defined before the start of the time period. For this, the owner of the ship 1 pays the service organization 13 a precisely defined sum of money 14 before the time period begins. The costs of rectifying faults in the defined time period are met by the service organization 13 up to the level of the agreed sum of money 14, and any costs 15 over and above this are met by an insurance company 16. For this purpose, the service organization 13 pays to the insurance company 16 a certain insurance premium 17. The owner of the ship 1 thus has costs which can be calculated and planned from the outset, and need not establish any separate reserves. The risk of uncertain costs is ultimately borne by the insurance company 16.

The entire organization and carrying out of fault rectification work 6 is effected by the technical service organization 13. By this means, the costs incurred by, the ship-owner for fault rectification are reduced. On the other hand downtimes can be reduced, by particularly expert fault rectification, by a service organization 13 specializing in activities of this type. Here, the costs assumed by the service organization 13 include, apart from the costs incurred purely for the fault rectification work, also such associated costs as travel and overnight costs for the service staff from the service organization 13.

Because the sum of money 14 covers in addition a regulated supply of spare parts, regular and selective maintenance together with expertly performed fault rectification and support for fault elimination activities by online support from the service organization 13, this ensures the maintenance of the value and a long service life for the ship's technical facilities, and their safety and reliability are also increased.

If desired, it is also possible to restrict the rectification of faults to a certain number of fault rectification incidents and certain sailing areas, the maintenance to a certain number of maintenance activities and to particular ports, the costs for spare parts to a certain budget and even the online-support incidents to a certain number. Activities by the service organization over and above this would then be charged separately to the ship-owner.

A system architecture 20 which supports the method shown in FIG. 2 is shown in FIG. 3. The service organization operates a central server 21, which can be accessed via one or more communications networks 22, e.g. via the Internet 23, mobile radio-communication networks 24 or satellite supported communications networks 25. By this means, faults can be reported to the service organization either directly from the ship 1 or from an operator's terminal 26 belonging to the ship-owner, and online support provided by the service organization via an operator's terminal 27. Here, the operator's terminal 27 is manned 24 hours per day. Apart from this, personnel from the service organization can be informed about a fault incident, and guided to their work location, via the central server 21. Via a mobile computer 29 and the central server 21, the staff can access facility-specific, system-specific and component-specific data for the ship 1, stored in a database 28. With the help of this data, the service organization can carry out technical services tailored to the individual requirements of the ship.

Figure 4:
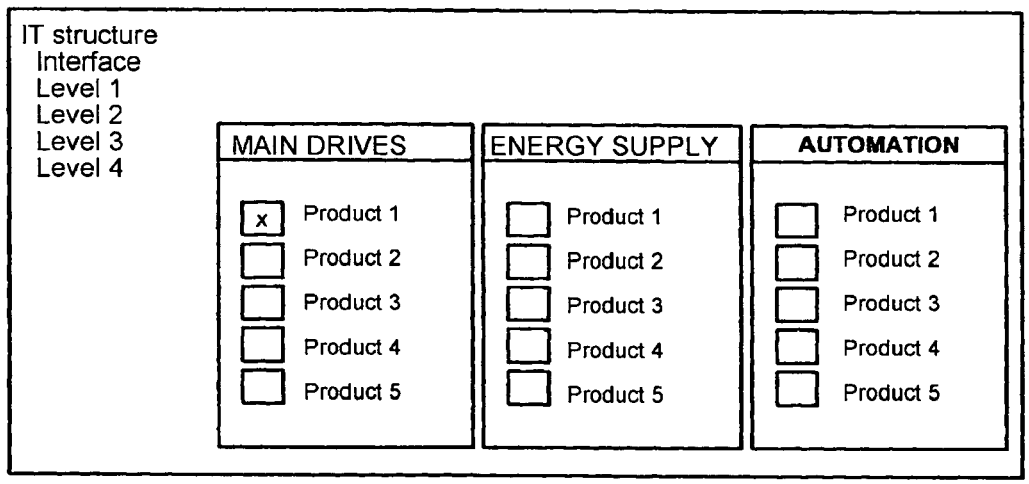
Figure 5:
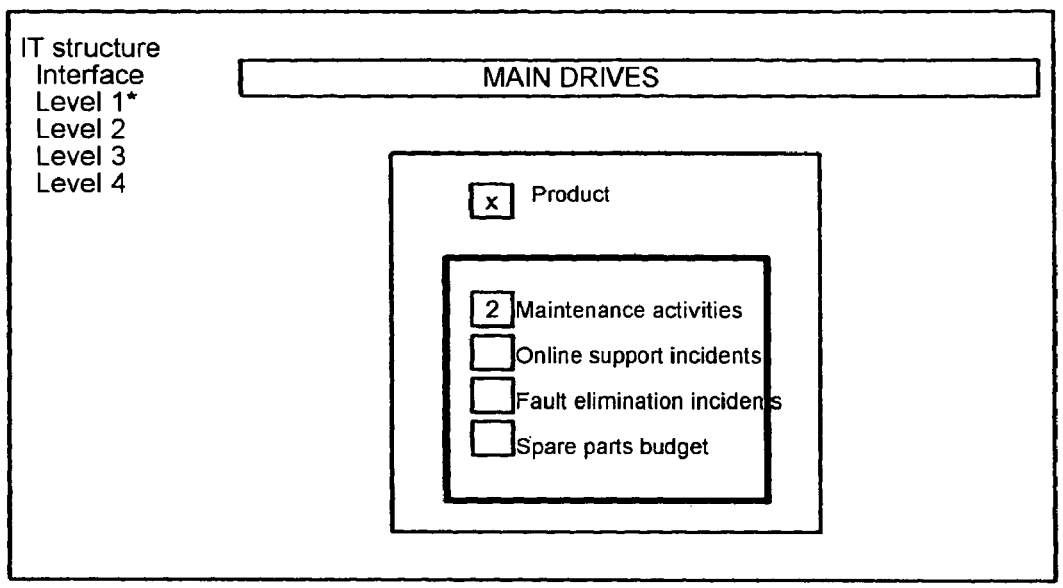
Figure 6:
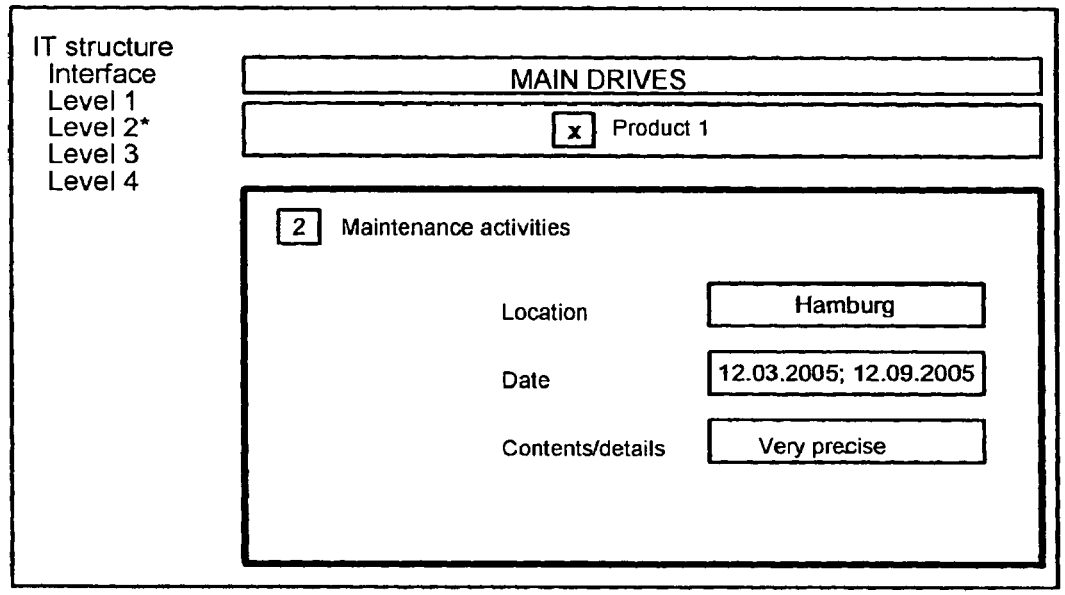
Figure 7:
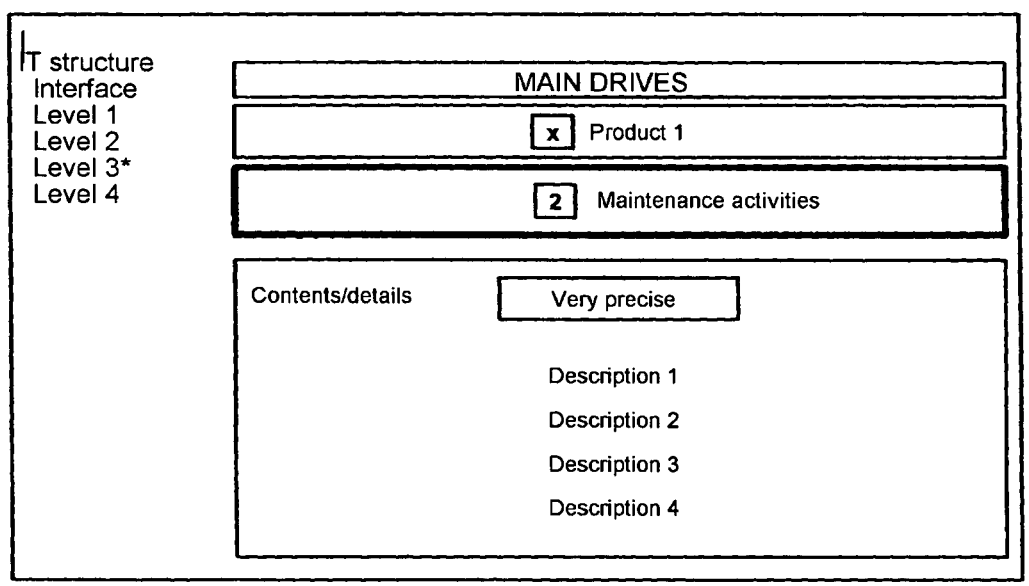

In the database 28 are stored fault elimination and maintenance measures for each component. Here, the database has a hierarchical structure. On a top level, shown in FIG. 4 as displayed, e.g. graphically, on a user interface on the operator's station 27 in FIG. 3, are stored details of the products which are present in the drive, energy supply and automation device areas in the ship. For each of these products is stored in turn—as shown in FIG. 5—the number of the agreed maintenance activities, online support incidents, fault elimination incidents together with the spare parts budget. For each of these points, more precise information can be stored on a lower hierarchical level. As illustrated in FIG. 6, the information stored for maintenance could be for example precise details of the location, time point and content/details of the maintenance work. These items of data can also be used as confirmation of maintenance measures carried out, e.g. for classification companies. As shown in FIG. 7, at yet lower hierarchical levels can be stored even more precise descriptions, for example about the content/details.

We claim:

1. A method for providing a payment scheme that minimizes financial risks for an operator of a technical facility when receiving services from a service organization, wherein the facility is a moveable ship such that its location changes, comprising:

receiving a definition of the nature and number of facility components of a technical facility comprising a moveable ship to be serviced by a service organization for a predefined period of time; wherein the services agreed to be provided by the service organization comprise (a) fault rectification services, (b) maintenance services, (c) spare parts procurement, and (d) online support for each of the facility components; receiving a restriction to each of the services agreed to be provided for each of the facility components such that the (a) fault rectification services are restricted by a number of incidents and a particular sailing area for the fault rectification services, the (b) maintenance services are restricted by a number of incidents and a particular port location for maintenance services, the (c) spare parts procurement are restricted by a cost budget for spare parts, and the (d) online support are restricted by a number of incidents for online support, such that activities over and above the restriction to each of the services are charged separately to the technical facility;

storing in a computer database associated with a central server of the service organization accessible via a communications network from a service operator's computer terminal, the nature and number of facility components, the services agreed to be provided for each of the facility components, the associated restriction for each of the services for each of the facility components, and predetermined fault elimination and maintenance measures for each component;

storing detailed information of services performed including maintenance work performed with details of location of the maintenance work, time, and content so as to provide confirmation of maintenance measures carried out; and receiving by the service organization from the technical facility a first sum of money for the services agreed to be provided by the service organization for the predefined period of time, subject to the restriction to each of the services that are charged separately to the technical facility, so that the costs for the services agreed to be provided are met up to the first sum of money, and wherein the first sum of money further includes a built-in insurance premium to be paid to an insurer by the service organization to insure the service organization so that the insurer covers any cost incurred by the service organization over and above the first sum of money for the services agreed to be provided by the service organization with a second sum of money, subject to the restriction to each of the services that are charged separately to the technical facility as a third sum of money, wherein a lowered insurance premium or a rebate of a portion of the insurance premium is provided when more measures are carried out during maintenance that result in an increase in reliability of facility components, thereby providing a payment scheme comprising a combination of three different sums of money for servicing a moveable ship.

2. The method in accordance with claim 1, whereby response and start-of-work times for the services to be provided by the service organization are agreed between the facility and the service organization before the start of the predetermined period of time.

3. The method in accordance with claim 1, wherein the first sum of money additionally covers maintenance work by the service organization for the facility components during the predefined period of time.

4. The method in accordance with claim 3, wherein the first sum of money additionally covers spare parts procurement by the service organization for the facility components during the predefined period of time.

5. The method in accordance with claim 4, wherein the first sum of money additionally covers online support by the service organization for the facility components during the predefined period of time.

6. The method in accordance with claim 5, wherein the fault rectification services actually undertaken by the service organization during the predefined period of time are stored in the computer database associated with the central server of the service organization.

7. The method in accordance with claim 6, wherein the computer database is Internet accessible.

8. The method in accordance with claim 1, wherein the facility components are selected from a group consisting of: drives, energy supply equipment and automation devices.

9. The method in accordance with claim 1, wherein the insurer is retained by the service organization.

10. The method in accordance with claim 1, wherein the insurer is retained by the technical facility.

11. A computer system-for providing a payment scheme that minimizes financial risks for an operator of a technical facility when receiving services from a service organization, wherein the facility is a moveable ship such that its location changes, comprising:

a central server of a service organization accessible via a communications network from a service operator's computer terminal for receiving a definition of the nature and number of facility components of a technical facility comprising a moveable ship to be serviced by a service organization for a predefined period of time, wherein the services agreed to be provided by the service organization comprise (a) fault rectification services, (b) maintenance services, (c) spare parts procurement, and (d) online support for each of the facility components; and for receiving a restriction to each of the services for each of the facility components such that the (a) fault rectification services are restricted by a number of incidents and a particular sailing area for the fault rectification services, the (b) maintenance services are restricted by a number of incidents and a particular port location for maintenance services, the (c) spare parts procurement are restricted by a cost budget for spare parts, and the (d) online support are restricted by a number of incidents for online support, such that activities over and above the restriction to each of the services are charged separately to the technical facility;

a computer database associated with the central server of the service organization for storing the nature and number of facility components, the associated restriction for each of the services for each of the facility components, the services agreed to be provided for each of the facility components, and predetermined fault elimination and maintenance measures for each component; and for storing detailed information of services performed including maintenance work performed with details of location of the maintenance work, time, and content so as to provide confirmation of maintenance measures carried out; and wherein the services to be provided by the service organization are subject to receiving by the service organization from the technical facility a first sum of money for the services agreed to be provided by the service organization for the predefined period of time, subject to the restriction to each of the services that are charged separately to the technical facility, so that the costs for the services agreed to be provided are met up to the first sum of money, and wherein the first sum of money further includes a built-in insurance premium to be paid to an insurer by the service organization to insure the service organization so that the insurer covers any cost incurred by the service organization over and above the first sum of money for the services agreed to be provided by the service organization with a second sum of money, subject to the restriction to each of the services that are charged separately to the technical facility as a third sum of money, wherein a lowered insurance premium or a rebate of a portion of the insurance premium is provided when more measures are carried out during maintenance that result in an increase in reliability of facility components, thereby providing a payment scheme comprising a combination of three different sums of money for servicing a moveable ship.

12. The system in accordance with claim 11, wherein the fault rectification services actually undertaken by the service organization during the predefined period of time are stored in the computer database associated with the central server of the service organization.

* * * * *